Figure 1:
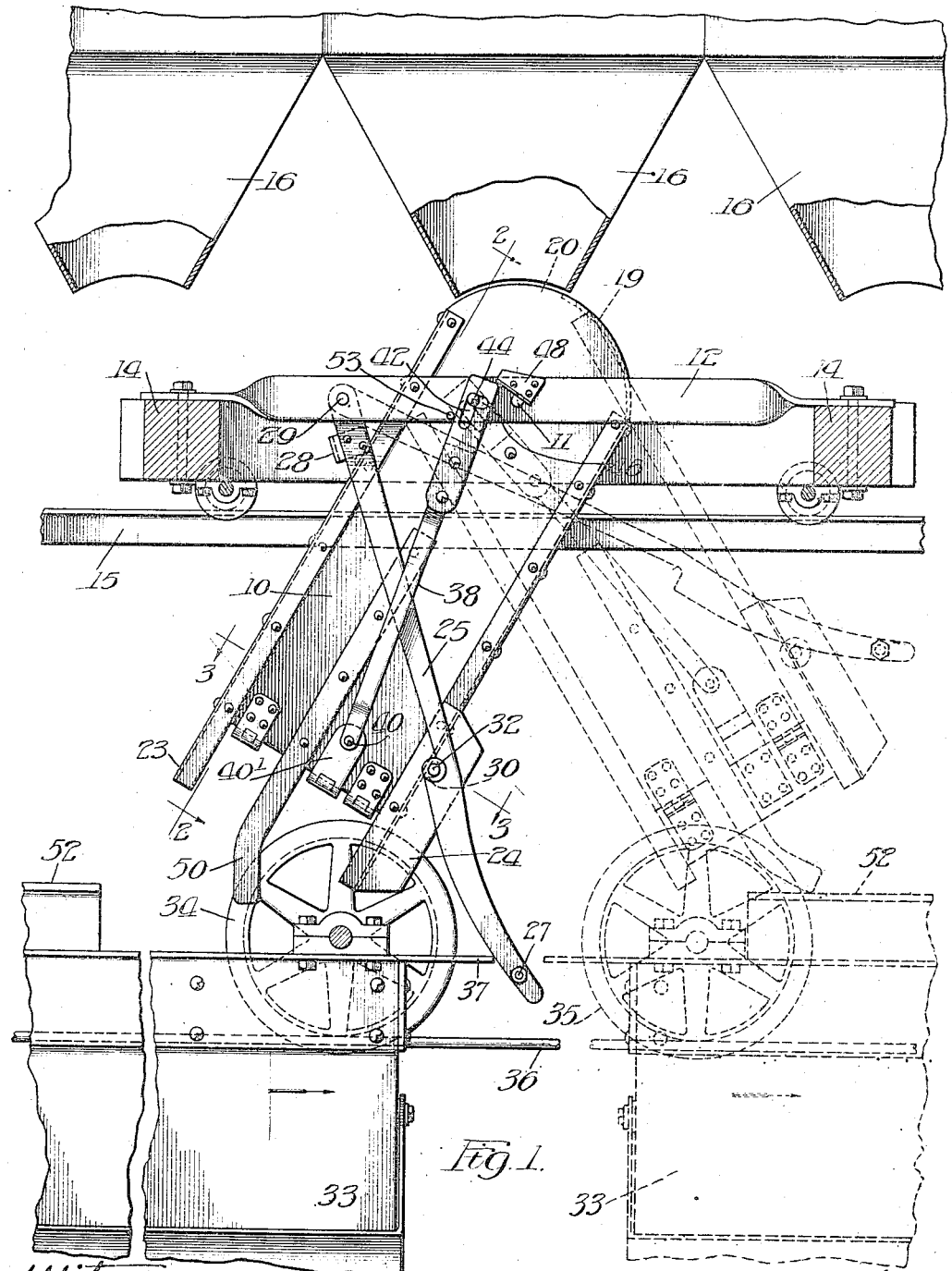

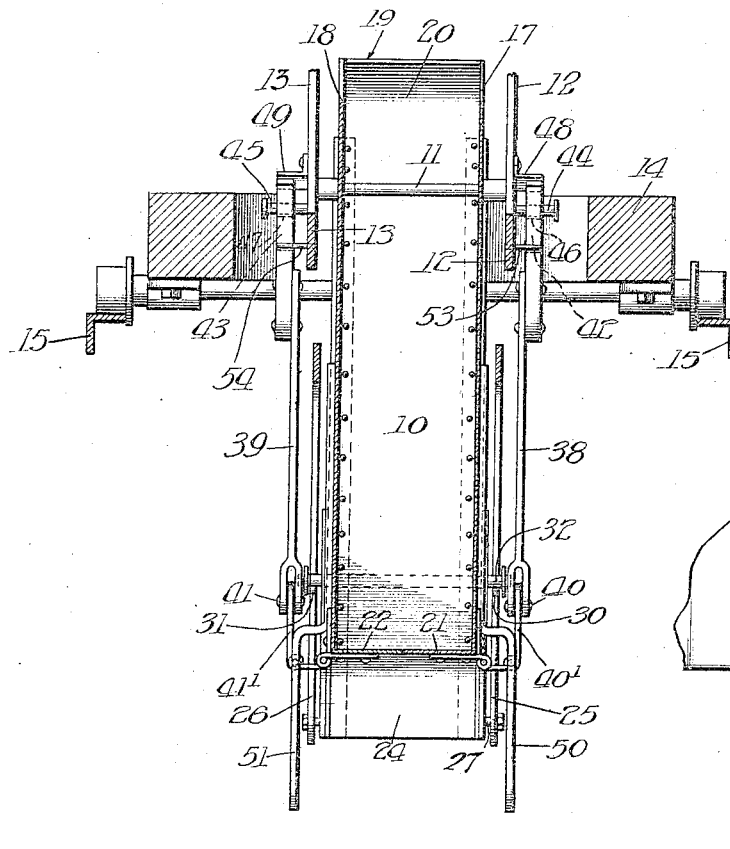
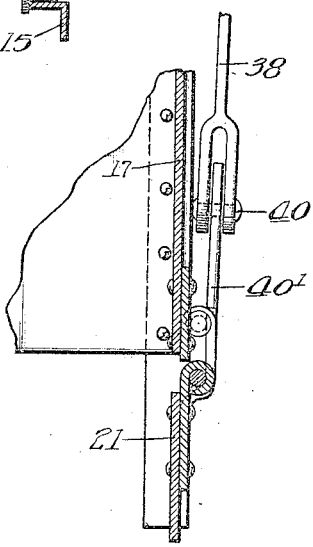
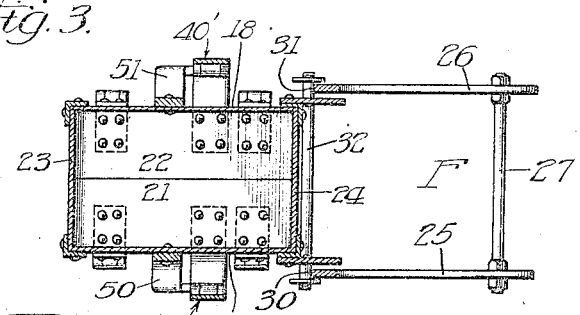

UNITED STATES PATENT OFFICE.

HUGH B. BROCKENBROUGH, OF FORT DODGE, IOWA.

CHUTE.

1,260,309.

Specification of Letters Patent.  Patented Mar. 26, 1918.

Application filed June 12, 1916.  Serial No. 103,197.

*To all whom it may concern:*

Be it known that I, HUGH B. BROCKENBROUGH, a citizen of the United States, and a resident of Fort Dodge, in the county of Webster and State of Iowa, have invented certain new and useful Improvements in Chutes, of which the following is a specification.

My invention relates to chutes particularly adaptable for loading vehicles in transit.

My invention is of great utility in tramway systems where the tram-cars are continually in motion over a circuit between loading and unloading stations and must, therefore, be loaded and unloaded while in transit. An important object of my invention is to produce a chute which is controlled entirely automatically to discharge its contents in a car passing thereunder and to be thereafter restored to normal position fully loaded for the next unloading operation. More in detail, the object of the invention is to have the operation of the chute controlled by mechanism operated by a car passing thereunder, and by gravity.

The details of construction are clearly shown on the accompanying drawings in which—

Figure 1 is a side elevational view showing the coöperation of the chute with cars passing thereunder, Fig. 2 is a sectional view on plane 2—2, Fig. 1, Fig. 3 is a sectional view on plane 3—3, Fig. 1, and Fig. 4 is an enlarged view, partly sectional, showing the chute door arrangement.

In the arrangement shown, the chute 10 is suspended from shaft 11 supported transversely between the beams 12 and 13 mounted longitudinally on the truck 14 which rests on rails 15 below a row of spouts 16 leading from a storage space for material to be loaded, the truck being shiftable on a track in order to bring the chute under any one of the spouts.

The chute shown is of rectangular cross-section, the upper ends of its sides 17 and 18 being arcuate with the shaft 11 as a center, an arcuate top 19 extending between the sides for half the distance, the remainder being open to provide an inlet 20 whose width is substantially equal to the width of the ends of the spouts 16. The lower ends of the spout sides are also arcuate to be concentric with the chute sides. At their lower edges of the chute sides 17 and 18 are hinged the doors 21 and 22, these doors extending normally across the chute as shown in Fig. 2, to close the bottom of the chute, and being adapted to swing in vertical position to open the chute for the discharge of its contents. As shown, the sides 23 and 24 of the chute extend a distance below the sides 17 and 18, and when the doors are opened they form with the extended sides 23 and 24 a continuation of the chute.

The chute is normally held in inclined position toward the direction from which a car approaches and with its lower end above the top of the car. Such inclined position is normally maintained by a trigger or tripping frame which comprises the side arms 25 and 26 and the transverse bars 27 and 28. At their upper ends the arms 25 and 26 are pivoted to the beams 12 and 13 respectively by a rod 29, the chute extending downwardly between the arms and the cross bars. Intermediate their ends the arms have the transverse shoulders or ledges 30 and 31 for receiving the ends of a rod 32 secured to the chute and extending beyond the sides 17 and 18 thereof. Normally the rod rests on the shoulders and holds the chute in inclined position, as shown in Fig. 1, the chute inlet 20 being in registration with the outlet of one of the spouts 16. The lower end of the tripping frame extends below the lower end of the chute and in the path of cars passing under the chute. As shown in Fig. 1, 33 represents a tram-car supported by its wheels 34 and 35 on a cable track 36. The full lines indicate the front or approaching end of the car and the dotted lines show the rear end of the car, the car traveling in the direction of the arrow indicated thereon. At the front end of the car is the abutment ledge 37 for striking the lower end of the chute trigger frame, such engagement releasing the shoulders 30 of the frame from the chute rod 32, the released chute then swinging downwardly by gravity toward the car interior ready for unloading.

The doors 21 and 22 of the chute are normally kept closed by means of links 38 and 39 which are pivoted at 40 and 41 to the extensions 40' and 41' on the hinges of the doors 21 and 22 as clearly shown in Fig. 4, the pivot arrangement being such as will allow swinging of the links parallel with the chute sides 17 and 18. At their upper ends the links have longitudinal slot sections 42 and 43 respectively for receiving the studs 44 and 45 extending laterally from the beams 12 and 13 of the chute supporting truck, such studs being in front of the chute pivot shaft 11. Extending transversely from the upper ends of the longitudinal slots 42 and 43 in a direction toward the shaft 11 are the slot sections 46 and 47. When the chute is in normal position and swung toward the direction from which a car approaches, the studs 44 and 45 are at the upper ends of the longitudinal slot sections and the upper ends of the links engage against abutments 48 and 49 secured to the beams 12 and 13 respectively. The length of the links is such that when the upper ends are against the under side of the abutments the doors will be held in closed position, as indicated in Fig. 2. However, when the approaching car strikes the tripping frame and the chute swings toward vertical position, the upper ends of the links will be swung away from the abutments and the doors will be unlocked and will be opened by the weight of the chute contents, which contents will fall into the car.

Secured to the sides 17 and 18 of the chute are the arms 50 and 51 which extend downwardly into the path of surfaces 52 at the opposite sides of the car at the trailing end thereof, the length of the arms and the coöperation thereof with the surfaces being such that after the chute has unloaded into the car it will be carried to the other side of its vertical position and inclined until the closed top section 19 of the chute comes under the spout outlet, as shown in dotted lines Fig. 1. As soon as the links 38 pass the vertical line and become inclined, gravity tends to swing them downwardly about their pivot connections 40 and 41 to bring the transverse slot sections 46 and 47 of the links into position to receive the studs 44 and 45. This is accomplished before the ends of arms 50 and 51 leave the surfaces 52, as shown in dotted lines Fig. 1. Then when the arms are released the chute will swing back to its normal position, but as the lower edges of the transverse slot sections 46 and 47 are now abutting against the studs 44 and 45 the chute doors will be closed before the chute reaches normal position. During such swing toward normal position the links 38 and 39 pass through the vertical position and become inclined in the opposite direction and gravity then tends to swing them downwardly to again bring the longitudinal slots 42 and 43 into position to receive the studs 44 and 45. However, such shifting of the links will not take place until the upper ends thereof have been brought underneath the abutments 48 and 49 to lock the links against longitudinal displacement and to prevent opening of the doors. After such locking the longitudinal slots are in registration with the studs so that the links are then free to shift longitudinally when they are freed from the abutments after tripping of the chute. In order to assure shifting of the links into locking engagement with the abutments 48 and 49, pins 53 and 54 are extended from the beams 12 and 13 to be engaged by the tops of the links to force them into position below the abutments when the chute swings back to normal position.

After the tripping frame has been engaged by the car to release the chute it is carried with the chute on the rod 32, and when the chute swings back to normal position after release thereof from the car the tripping frame follows and brings its shoulders 30 and 31 below the rod 32 to lock the chute in normal position ready for release by the next car. When the chute comes back into normal position it will again register with the spout and will be charged.

I thus provide simple and efficient chute mechanism which is released for unloading by its coöperation with a car and which will load the car while in rapid transit. After release from the car it automatically swings back into normal position, closes itself, and is recharged ready to load the next car. No manual operations of any kind are necessary. I do not, of course, desire to be limited to the exact construction, arrangement and operation shown, as changes and modifications are no doubt possible which would still come within the scope of the invention.

I claim as follows:

1. In chute mechanism for loading vehicles in transit, the combination of a chute pivoted at its upper end to swing to either side of vertical, a trip lever normally holding said chute in inclined position toward an approaching vehicle, said lever extending into the path of the vehicle to be engaged thereby to release the chute for swing with the vehicle, means on the vehicle for coöperating with the chute to continue the swing thereof, said chute being normally closed, and means for automatically opening said chute after release thereof and while moving with the vehicle.

2. In chute mechanism for loading vehicles in transit, the combination of a chute pivoted to swing above the path of a vehicle, latch mechanism normally locking said chute in inclined position, doors for said chute, stop mechanism normally preventing opening of said doors, said latch mechanism extending into the path of a vehicle to be engaged thereby to release the chute for downward swing, and means on said chute for coöperating with the vehicle to continue the swing of the chute, said stop mechanism becoming ineffective during swing of said chute after release thereof whereby said doors will open.

3. In chute mechanism for loading vehicles in transit, the combination of a chute pivoted to swing over the path of a vehicle, latch mechanism normally locking said chute swung toward an approaching vehicle, doors hinged to the lower end of said chute and normally in closed position, links at opposite sides of said chute connected with the respective doors, stationary stops normally engaged by said links to hold said links in position to prevent opening of the doors, said latch mechanism extending into the path of a vehicle to be engaged thereby to release the chute, and means whereby said links become disconnected from said stops during swing of said chute whereby said doors are released.

4. In chute mechanism for loading vehicles in transit, the combination of a chute pivoted at its upper end to swing parallel with and above the path of vehicles, latch mechanism normally holding the chute toward the direction of approach of vehicles, a door for said chute, a hinge for said door having an arm extending therefrom, a link pivoted to said arm and extending upwardly therefrom, a stationary abutment normally engaged by the upper end of said link and holding said link in position to prevent opening of the door, said latch mechanism extending into the path of vehicles to be engaged thereby to release the chute for downward swing, and means whereby said link is released from the abutment during such swing of the chute to permit opening of the door.

5. In chute mechanism for loading vehicles in transit, the combination of a supporting frame above the path of vehicles, a chute pivoted at its upper end to said frame to swing parallel with the vehicle path, latch mechanism normally holding said chute swung toward the direction of approach of vehicles and extending into the path of vehicles to be actuated thereby to release the chute, said chute after such release being swung downwardly by force of gravity, arms extending from said chute into the path of vehicles to be engaged thereby after release from the latch mechanism to effect continued swing of the chute, doors normally closing said chute, means for automatically unlocking said doors during swing of the chute after unlatching thereof, and means for automatically re-locking said doors in closed position during return of said chute to normal position after release thereof from the vehicle.

6. In chute mechanism for loading vehicles in transit, the combination of a supporting frame, a chute pivoted at its upper end to swing on said frame, latch mechanism normally holding said chute in inclined position, a door for said chute normally in closed position, a link pivoted at its lower end to said door and having a slot in its upper end, a pin on said chute supporting frame extending into said slot, said slot having a vertical section and a transverse section and said vertical section normally receiving said pin, an abutment plate on said frame adjacent the upper end of said link and the upper end of said link being normally in engagement with said abutment whereby said link is normally held down and said door held in closed position, the upper end of said link moving away from said abutment when said chute swings after unlatching thereof whereby said link may shift vertically to permit opening of said door, said chute when unlatched swinging past the center line to bring the transverse slot of said link into position to receive said pin whereby during return swing of said chute to normal position said link will be prevented from shifting longitudinally and said door will be closed.

7. In chute mechanism for loading vehicles in transit, the combination of a supporting frame, a chute pivoted at its upper end to said frame, a releasable latch normally holding said chute in inclined position, a door for the outlet of said chute, a link extending upwardly from said door and having a longitudinal slot at its upper end, a pin extending from said frame at one side of the pivot of said chute and normally receiving said longitudinal slot at its upper end, an abutment on said frame normally engaging the top of said link to hold it down and said door being held in closed position when said link is down, said chute swinging downwardly when said latch is released therefrom, the link being released at its upper end from said abutment during swing of said chute, said longitudinal slot permitting upward shift of the released link to permit opening of the door, said link having a transverse slot at the upper end of said longitudinal slot for receiving the pin at the end of the swinging movement of said chute whereby when said chute is swung back to normal position said link will be locked by said pin against longitudinal movement and said door will be closed.

8. In chute mechanism for loading vehicles in transit, the combination of a chute pivoted at its top to be adapted to swing over the path of vehicles, a latch lever normally locking the chute swung toward the direction of approach of vehicles, doors for said chute and locking mechanism normally in position to lock the doors, said latch extending into the path of vehicles to be shifted thereby to release the chute to be swung by gravity, arms on said chute normally out of the path of vehicles but adapted to be engaged thereby after the chute has been released by the latch mechanism whereby the swing of said chute is positively continued by the vehicle, means for unlocking the locking mechanism after a distance of swing of said chute following release, and means operable at the end of swing for setting said locking mechanism to effect re-locking of the doors when the chute swings back to normal position.

9. In chute mechanism for loading vehicles in transit, the combination of a supporting frame, a chute pivoted at its upper end to said frame, a releasable latch normally holding said chute in inclined position, a door for the outlet of said chute, a link extending upwardly from said door and having a longitudinal slot at its upper end, a pin extending from said frame at one side of the pivot of said chute and normally receiving said longitudinal slot at its upper end, an abutment on said frame normally engaging the top of said link to hold it down and said door being held in closed position when said link is down, said chute swinging downwardly when said latch is released therefrom, the link being released at its upper end from said abutment during swing of said chute, said longitudinal slot permitting upward shift of the released link to permit opening of the door.

In witness whereof I hereunto subscribe my name this 5 day of June, A. D., 1916.

H. B. BROCKENBROUGH.

Copies of this patent may be obtained for five cents each, by addressing the "Commissioner of Patents, Washington, D. C."